(12) United States Patent
Kirti (10) Patent No.: US 11,334,556 B1
(45) Date of Patent: *May 17, 2022

(54) ACCURACY OF LOW CONFIDENCE MATCHES OF USER IDENTIFYING INFORMATION OF AN ONLINE SYSTEM

(71) Applicant: Meta Platforms, Inc., Menlo Park, CA (US)

(72) Inventor: Rituraj Kirti, Los Altos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/421,394

(22) Filed: May 23, 2019

Related U.S. Application Data (63) Continuation of application No. 15/215,209, filed on Jul. 20, 2016, now Pat. No. 10,339,129.

(51) Int. Cl.
| | | |
|---|---|---|
| *G06F 16/00* | (2019.01) | |
| *G06F 16/23* | (2019.01) | |
| *G06F 16/9535* | (2019.01) | |
| *G06F 16/35* | (2019.01) | |
| *G06F 16/9035* | (2019.01) | |
| *H04L 67/50* | (2022.01) | |

(52) U.S. Cl.
CPC .......... *G06F 16/2365* (2019.01); *G06F 16/35* (2019.01); *G06F 16/9035* (2019.01); *G06F 16/9535* (2019.01); *H04L 67/22* (2013.01)

(58) Field of Classification Search
CPC .. G06F 16/2365; G06F 16/35; G06F 16/9035; G06F 16/9535; H04L 67/22

USPC .................................................. 707/705–780
See application file for complete search history.

(56) References Cited

U.S. PATENT DOCUMENTS

| | | | |
|---|---|---|---|
| 7,783,629 B2* | 8/2010 | Li | G06F 16/313 707/723 |
| 8,694,632 B1 | 4/2014 | Shubina et al. | |
| 9,715,508 B1* | 7/2017 | Kish | G06K 9/00993 |
| 2013/0254329 A1 | 9/2013 | Lin et al. | |
| 2013/0282699 A1 | 10/2013 | Feng et al. | |
| 2015/0324857 A1 | 11/2015 | Siegel et al. | |

(Continued)

OTHER PUBLICATIONS

United States Office Action, U.S. Appl. No. 15/215,209, dated Sep. 7, 2018, 16 pages.

*Primary Examiner* — Michelle N Owyang
(74) *Attorney, Agent, or Firm* — Fenwick & West LLP (57) ABSTRACT

An online system receives third party user identifying information. The online system accesses accuracy measures associated with each of a plurality of the user identifying information sets. The online system identifies high accuracy sets of user identifying information that include the one or more types of user identifying information included in the received types of the third party user identifying information. The online system identifies as high confidence matches those local users of the online system having the high accuracy sets of user identifying information that match a corresponding set of third party user identifying information for the plurality of third party users. The online system also identifies as low confidence matches, and identifies as similar matches those of the low confidence matches that have a measure of similarity to one or more of the high confidence matches that is beyond a threshold measure of similarity.

20 Claims, 3 Drawing Sheets

(56) References Cited

U.S. PATENT DOCUMENTS

| | | |
|---|---|---|
| 2015/0363407 A1 | 12/2015 | Huynh et al. |
| 2016/0078134 A1* | 3/2016 | Zhou .................. G06F 16/9535 707/734 |
| 2016/0085815 A1 | 3/2016 | Tsuchiya et al. |

* cited by examiner

ACCURACY OF LOW CONFIDENCE MATCHES OF USER IDENTIFYING INFORMATION OF AN ONLINE SYSTEM

CROSS REFERENCE TO RELATED APPLICATIONS

This application is a continuation of co-pending U.S. application Ser. No. 15/215,209, filed Jul. 20, 2016, which is incorporated by reference in its entirety.

BACKGROUND

This disclosure relates generally to online systems storing identity information for users, and in particular to improving accuracy of low confidence matches of user identifying information of an online system.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. In some cases, a third party system provides the online system with a list of user identifying information. This information is typically hashed or obscured such that the online system may determine if local information matches this obscured information, but cannot recover any useful data from the obscured information directly.

The user identifying information that is received from the third party system may not be able to uniquely identify a particular user. For example, if the information received is "John Smith, DOB: 10/10/1980," this might match more than one user in the online system. Thus, the online system may only be able to match a minority of the users to the user identifying information received from the third party system. This creates an inefficient system where a large amount of potentially useful data may be lost.

SUMMARY

Embodiments of the invention include an online system that identifies sets of third party user identifying information that have a high accuracy rate. A set of user identifying information with a high accuracy rate is one that can uniquely identify a user. The online system matches local users with third party users of the third party system that have the high accuracy sets of third party user identifying information. The online system matches local users with a measure of similarity to those local users matched with the high accuracy information with third party users with sets of third party user identifying information that have a low accuracy rate. Using this method, the online system can match additional users other than those with high accuracy data, and provide a third party system with additional matches.

The online system receives one or more types of third party user identifying information describing each of a plurality of third party users. The third party user identifying information may be hashed. If so, the user identifying information of local users is matched to the third party user identifying information by hashing the user identifying information of the local users and comparing the hash to the hash of the third party user identifying information. The hash used may be a hash function such as SHA-256.

The online system accesses data maintained by the online system including measures of accuracy associated with a plurality of sets of user identifying information. A measure of accuracy is associated with a set of local user identifying information (e.g., a set could be username and date of birth) based at least in part on local users having one or more types of local user identifying information in the set matching the one or more types of third party user identifying information in the set associated with at least one third party user. The sets of user identifying information could include combinations of addresses, unique identifiers, network addresses, date of births, postal codes, physical addresses, geolocations, names, genders, and phone numbers.

The online system identifies as high accuracy sets of user identifying information those sets of user identifying information that are included the received third party user identifying information, and which are also associated with a measure of accuracy that is above a threshold level according to the accessed data. For example, a high accuracy set of user identifying information may be a set including an email address (which is a type of user identifying information), as an email address is likely to be unique to users. Another example of a high accuracy set of user identifying information may be a full name, date of birth, and zip code, as this may likely be unique as well. An example of a set of user identifying information that has low accuracy is a gender and a zip code, which would not be very unique.

In one embodiment, this identification of the high accuracy sets of user identifying information includes identifying the received types of user identifying information in the third party user identifying information, identifying sets of the received types of user identifying information that provide user identifying information for at least one third party user, and identifying, as the high accuracy sets of user identifying information, the sets of the received types of user identifying information that match the sets of user identifying information in the accessed data that are associated with the measure of accuracy above the threshold level.

The online system identifies as high confidence matches those local users of the online system having the high accuracy sets of user identifying information that match a corresponding set of third party user identifying information for the plurality of third party users. For example, if the third party user identifying information has a high accuracy set of user identifying information such as an email address for a third party user, and if the online system matches this email address with the email address of a local user, this would be a high confidence match.

In one embodiment, the identification of the high confidence matches includes identifying as high accuracy matched users those local users of the online system having sets of user identifying information that match the high accuracy sets of user identifying information, matching the user identifying information of one or more of the high accuracy matched users with the third party user identifying information, and identifying as high confidence matches those high accuracy matched users with matches to the third party user identifying information.

The online system identifies as low confidence matches those local users of the online system having sets of user identifying information that are not a high accuracy set that match a corresponding set of third party user identifying information for the plurality of third party users. For example, a set of user identifying information that is not a high accuracy set may be name and city. The online system identifies in the third party user identifying information third party users with sets of user identifying information that include name and city data, and matches these with local users with the same set of user identifying information. These are the low confidence users.

In one embodiment, the identification of the low confidence matches includes identifying as low accuracy matched users those local users of the online system having sets of user identifying information that do not match the high accuracy sets of user identifying information, matching the user identifying information of one or more of the low accuracy matched users with the third party user identifying information, and identifying as low confidence matches those low accuracy matched users with matches to the third party user identifying information.

The online system identifies similar matches. These are the low confidence matches that have a measure of similarity to one or more of the high confidence matches that is beyond a threshold measure of similarity. A measure of similarity for the low confidence matches is based on at least in part on one or more characteristics of the low confidence matches matching the identified one or more characteristics associated with each of the high confidence matches. These characteristics may include user preferences, connections in the online system, and so on. It is assumed that the third party users identified by the third party user identifying information have general similarities with each other. In such a case, those low confidence matches that are similar to the high confidence matches are more likely to be the actual users identified in the third party user identifying information, and the other low confidence matches may be unrelated.

In one embodiment, the identification of the similar matches includes determining that a set of one or more of the similar matches match the third party user identifying information for the same third party user, and filtering out similar matches from the set of one or more of the similar matches to include only one similar match with the highest measure of similarity of the similar matches in the set of one or more similar matches.

The online system provides a first selection of the high confidence matches and a second selection of the similar matches to a third party system. Thus, in addition to being able to select the traditional high confidence matches, the third party system is now able to select the similar matches as well. This gives the third party system additional users for which to target and who are likely to be the same as the users identified in the third party user identifying information.

In one embodiment, the online system also determines a score for the similar matches based on the measure of similarity for each similar match. For example, a higher measure of similarity may indicate a higher score. The online system also determines a score for each high confidence match based on the measure of accuracy of the high accuracy set of user identifying information used to match the high confidence user. For example, if a high confidence match was matched based on a set of user identifying information with a particular measure of accuracy, that measure of accuracy may be used to calculate the score. The online system provides an indication of these scores to the third party system.

The online system may also determine a bid value for each similar match. The bid value for each similar match may be proportional to a bid value for a high confidence match based on the measure of similarity of the similar match. Thus, for example, if a bid value for a high confidence match is X, then the bid value for a similar match may be X-Y, where Y is inversely proportional to the measure of similarity of the similar match (i.e., the higher the similarity, the smaller the Y value). The online system may provide this bid value to the third party system.

In some cases, the high confidence matches and the similar matches are limited to those users of the online system within a particular geographic region.

Using such a system, an online system may be able to provide additional matches to a third party system for user identifying information provided by the third party system. While these additional matches were previously unusable due to their low confidence (i.e., low confidence of an accurate match), since the online system now only keeps those low confidence matches with high similarity to the high confidence matches, these low confidence matches may provide value to the third party system in that they are more likely to be accurate matches.

BRIEF DESCRIPTION OF THE DRAWINGS

Figure (FIG. 1 is a high level block diagram of a system environment for an online system, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
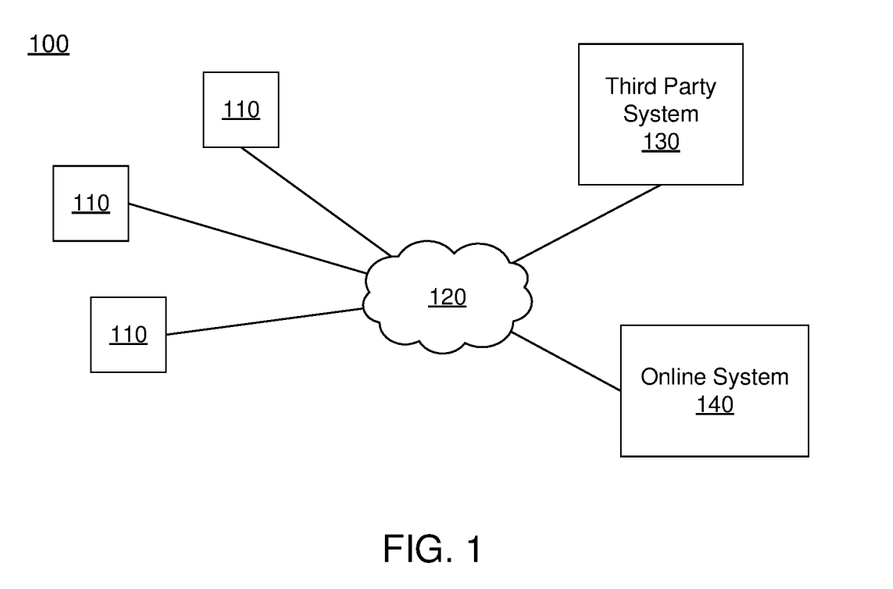

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a sponsored content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates sponsored content, such as advertisements, to the online system 140 for display to users of the client devices 110. The sponsored content may be created by the entity that owns the third party system 130. Such an entity may be an advertiser or a company producing a product or service that the company wishes to promote.

Figure 2:
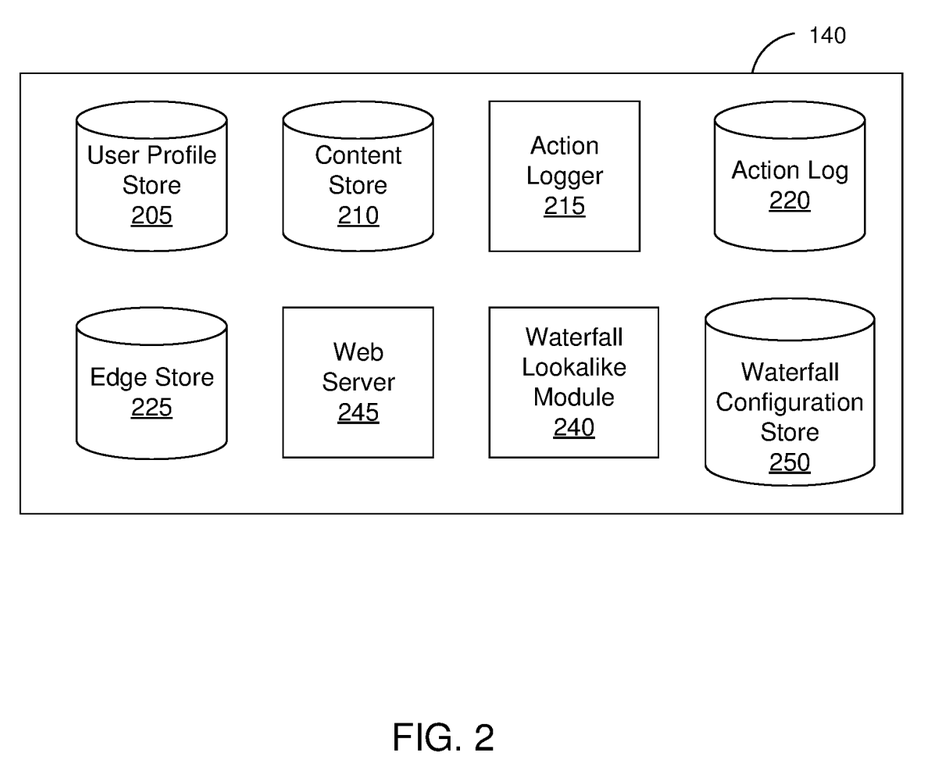
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a sponsored content request store 320, a waterfall configuration store 250, a waterfall lookalike module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. Patent Pub. No. 2012/0166532, filed on Dec. 23, 2010, U.S. Patent Pub. No. 2014/0156744, filed on Nov. 30, 2012, U.S. Patent Pub. No. 2014/0156566, filed on Nov. 30, 2012, and U.S. Patent Pub. No. 2014/0156360, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

The waterfall configuration store 250 stores information regarding a measure of accuracy for sets of user identifying information indicating the likelihood that user identifying information may accurately identify a user of the online system 140.

An online system 140 may receive from a third party system 130 various types of user identifying information (i.e., third party user identifying information) for users of the third party system (i.e., third party users). The types of information received may include but are not limited to: email addresses, unique identifiers (e.g., a username), network addresses (e.g., Internet Protocol (IP) addresses), date of births, postal codes, physical addresses, other locations, names, genders, phone numbers, and so on. Additionally, for each third party user, the online system 140 may receive from the third party system 130 one or more of these user identifiers as user identifying information to the online system 140. Each third party user may be identified with varying numbers of types of user identifying information, and thus, each third party user may be identified with various sets of user identifying information.

Each set of user identifying information for each third party user may be used by the online system 140 to match against local users of the online system 140. For example, user identifying information received from the third party system 130 (which may or may not be hashed) may indicate a name "John Smith," a date of birth "10/02/1970," and a zip code "94040." The online system 140 searches through its own user profiles to find a match for this information.

The waterfall configuration store 250 stores for one or more of these sets of user identifying information a measure of accuracy. A measure of accuracy associated with a set of user information provides an indication of a likelihood of identifying a particular user of a source for that set of user identifying information. For example, for the online system 140, an email address may have a high measure of accuracy as it can uniquely identify a local user of the online system 140, while a date of birth may have a low measure of accuracy.

Figure 4:
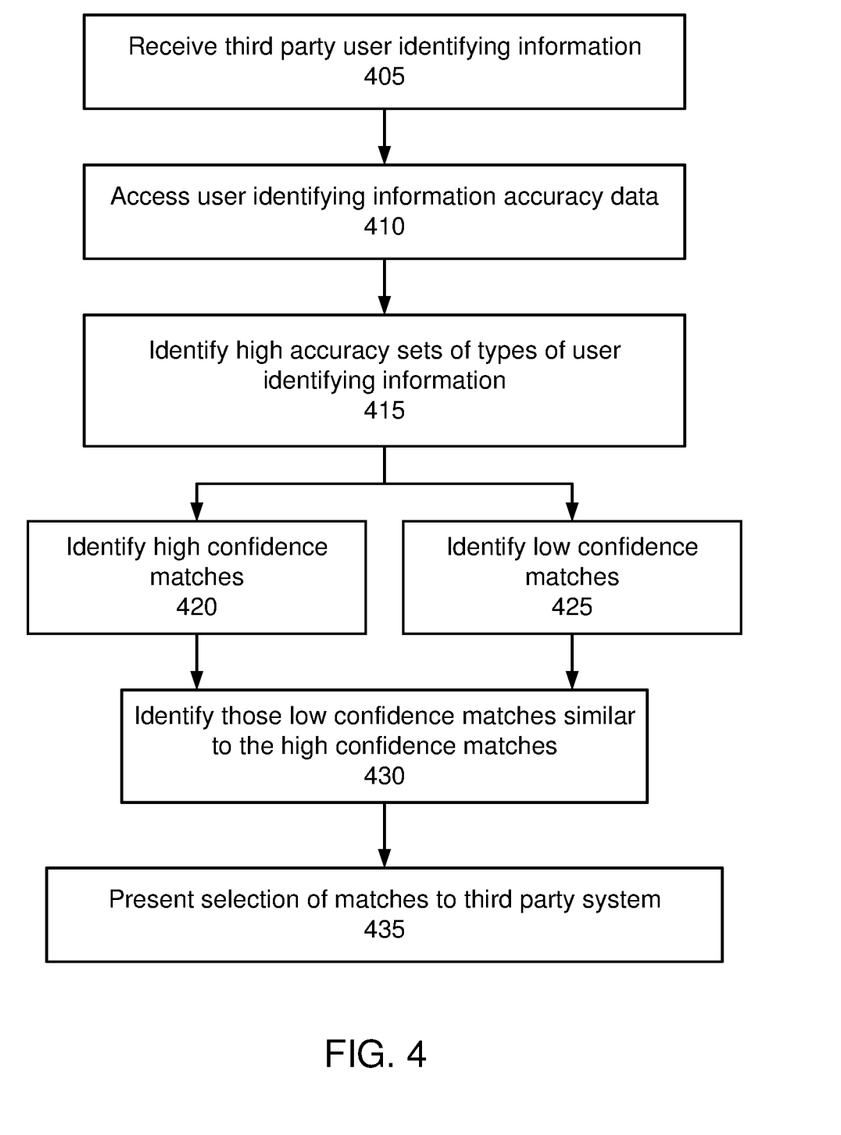
FIG. 4 is a flowchart of one embodiment of a method in an online system 140 for improving the accuracy of matches to user identifying information provided by a third party system, according to an embodiment.

To determine the measure of accuracy for different sets of user identifying information, in one embodiment, the online system 140 identifies users from a pair of sources and obtains or receives, such as described in step 405 of FIG. 4, user identifying information associated with each user by the sources. One of these sources may be the online system 140, and one may be one or more third party systems 130. The online system 140 compares user identifying information from these two sources and determines a score for users identified using this information (e.g., the score may be based on how many types of user identifying information were matched between the two sources). The online system 140 may then determine the measure of accuracy based on these scores (e.g., based on an average of these scores or a weighted computation of these scores). In general, those sets of user identifying information or types of user identifying information that may more accurately identify a user of the online system 140 without false positives or errors are associated with higher measures of accuracy.

Additional details regarding the determination of a measure of accuracy for types of user identifying information are further described in U.S. Patent Pub. No. 2016/0078134, filed on Sep. 16, 2014, which is hereby incorporated by reference in its entirety.

In one example, the waterfall configuration store 250 stores the following ranking (e.g., "waterfall") of types of user identifying information and a measure of accuracy associated with each.

TABLE 1

| User Identifying Information | Measure of Accuracy |
| --- | --- |
| Date of Birth; Email | 97% |
| Email | 95% |
| Name; Gender; Location | 68% |
| Gender; Location | 3% |

As shown in Table 1 above illustrating exemplary measures of accuracy for various user identifying information, a date of birth and email may indicate a very high measure of accuracy of 97% as the likelihood that two users could share such information would be very unlikely. On the other hand, a gender and location only has a measure of accuracy of 3% as many users may share the same gender and location information within the online system (e.g., male from zip code 90024 (Los Angeles)).

The measures of accuracy stored in the waterfall configuration store 250 may change depending on the third party system 130 providing the information, and/or other factors, such as the geographic location of users that are to be matched, and so on. For example, names by themselves may be more uniquely identifying in different parts of the world, and so on.

The waterfall lookalike module 240 uses the information of the waterfall configuration store 250, such as described in step 410 of FIG. 4, to improve the accuracy of matches of user identifying information between the third party system 130 and the online system 140 that originally have a low measure of accuracy. Additional details regarding the waterfall lookalike module 240 will be described below.

Figure 3:
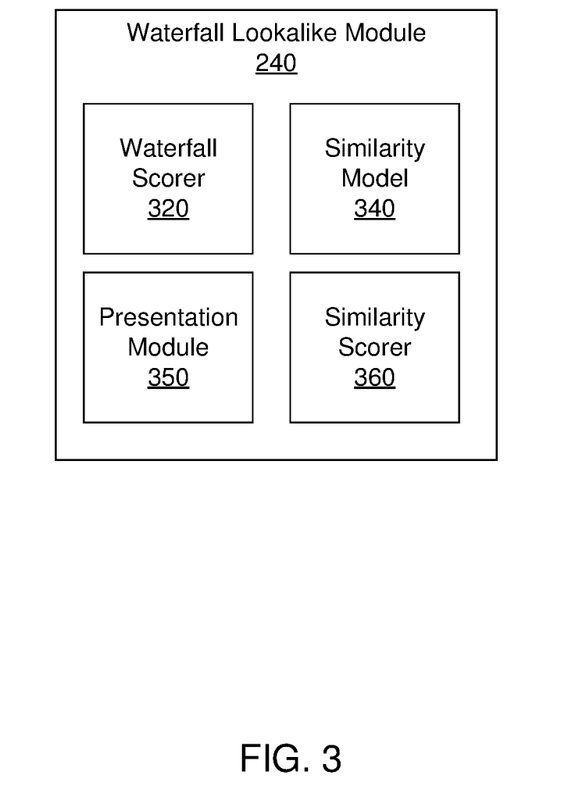
FIG. 3 is an example block diagram of an architecture of the waterfall lookalike module 240, according to an embodiment.

FIG. 3 is an example block diagram of an architecture of the waterfall lookalike module 240, according to an embodiment. The waterfall lookalike module 240 shown in FIG. 3 includes a waterfall scorer 320, a similarity model 340, a similarity scorer 360, and a presentation module 350. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The waterfall scorer 320 matches user identifying information received from the third party system 130 for third party users with user identifying information of local users of the online system 140. The user identifying information for local users may be stored in the user profile store 205. When the waterfall scorer 320 receives, such as described in step 405 of FIG. 4, a set of user identifying information for a third party user, the waterfall scorer 320 attempts to match this information with the same type(s) of user identifying information for a local user. For those matches for types of user identifying information with a high measure of accuracy beyond a certain threshold (e.g., the date of birth and email address of Table 1), such as described in step 415 of FIG. 4, the waterfall scorer 320 indicates the matched users as high confidence matches, such as described in step 420 of FIG. 4. For those matches for types of user identifying information with a measure of accuracy below the threshold, the waterfall scorer 320 indicates these matched users as low confidence matches, such as described in step 425 of FIG. 4. The waterfall scorer 320 may access the data indicating the measure of accuracy for types of user identifying information from the waterfall configuration store 250, such as described in step 410 of FIG. 4.

The similarity model 340 is used to determine users that have a measure of similarity to the high confidence matches. As used here, the similarity model 340 is trained using the characteristics of the high confidence matches. These characteristics may include actions, preferences, and other information related to the high confidence matches as stored by the online system 140. Once trained, the similarity model 340 is able to determine a measure of similarity of another user of the online system 140 based on the characteristics of that user.

The similarity scorer 360 uses the similarity model 340 to determine a similarity of one or more of the low confidence matches with the high confidence matches such as described in step 430 of FIG. 4. In one embodiment, the similarity scorer 360 first trains the similarity model 340 using the characteristics of the high confidence matches. After training the similarity model 340, the similarity scorer 360 identifies as similar matches those of the low confidence matches that have at least a threshold level of similarity to the high confidence matches according to the similarity model 340.

The presentation module 350 provides the high confidence matches and the similar matches to the third party system, such as described in step 435 of FIG. 4. These matches may be provided in detail, with information about each match, or may be provided as an aggregated indicator. For example, the presentation module 350 may indicate to the third party system 130 that a set of high confidence matches was found for the user identifying information provided by the third party system 130, and in addition, a set of similar matches was also identified by the online system 140. The presentation module 350 may indicate to the third party system 130 a confidence level for the similar matches that may be based on the measure of similarity of the similar matches. The presentation module 350 allows the third party system to select the high confidence matches, and optionally, allows the third party system 130 to select the similar matches. The online system 140 may present sponsored content to those selected matches. If sponsored content is to be presented to users corresponding to these matches, the presentation module 350 may present the third party system 130 with different compensation values for each set of matches depending on the confidence level associated with each.

By identifying those low confidence matches that are similar to the high confidence matches and presenting these similar users along with the high confidence matches to the third party system 130, the online system 140 is able to produce additional matches beyond the high confidence matches, while ensuring a high accuracy of these additional, similar matches. The similar matches have a higher accuracy compared to the low confidence matches because there is a high probability that the users identified in the third party user identifying information are all similar to each other. For example, if the third party system 130 provides a particular service or product, and the third party user identifying information identifies third party users who have accessed the third party system 130 (e.g., to make a purchase), then these third party users are more likely to be similar to each other than to a random sampling of users of the online system. By providing additional, similar matches of higher accuracy, the online system 140 is able to provide the third party system 130 with more matches to utilize (e.g., for a promotional campaign).

Additional details regarding the waterfall lookalike module 240 will be described with reference to FIG. 4.

Improving the Accuracy of Matches to User Identifying Information Provided by a Third Party System FIG. 4 is a flowchart of one embodiment of a method in an online system 140 for improving the accuracy of matches to user identifying information provided by a third party system, according to an embodiment. In other embodiments, the method may include different and/or additional steps than those described in conjunction with FIG. 4. Additionally, in some embodiments, the method may perform the steps described in conjunction with FIG. 4 in different orders. In one embodiment, the method is performed by the components of the online system 140, such as the waterfall lookalike module 240.

Initially, the online system 140, e.g., the waterfall scorer 320 as described in conjunction with FIG. 3, receives 405 third party user identifying information from a third party system 130. As noted above, user identifying information may include various information about a user and may include various types of information, such as date of birth, address, email, and so on.

In one embodiment, the third party user identifying information received by the online system 140 from the third party system 130 is hashed. In other words, a one way transform has been applied to the third party user identifying information such that the original data of the third party user identifying information cannot be recovered from the output of the transform. This allows the third party system 130 to prevent the online system 140 from directly determining any personally identifiable information from the transformed third party user identifying information. Instead, the online system 140 applies to the same transform (e.g., a hash) to local user identifying information of the same type and attempts to match this transformed information with the transformed third party user identifying information in order to recover the information within the third party user identifying information. If the online system 140 is able to find a match, then the online system 140 can determine that the particular local user identifying information 470 is the same as the information provided by the third party user identifying information.

Additional details regarding matching transformed user identifying information are further described in U.S. Patent Pub. No. 2013/0138569, filed on Nov. 29, 2011, which is hereby incorporated by reference in its entirety.

The online system 140, e.g., the waterfall scorer 320 as described in conjunction with FIG. 3, accesses 410 the waterfall data stored in the waterfall configuration store 250. As noted above, the waterfall configuration store 250 stores information regarding measures of accuracy for various sets of user identifying information. For each set of user identifying information, the measure of accuracy for that set indicates the likelihood that that set of information may accurately identify a user of the online system. For example, gender and postal code alone may have a low measure of accuracy, but a name, gender, and postal code may indicate a higher measure of accuracy.

The online system 140, e.g., the waterfall scorer 320 as described in conjunction with FIG. 3, identifies 415 high accuracy sets of user identifying information as those sets of user identifying information from the received types of user identifying information of the third party user identifying information that are associated with a measure of accuracy that is above a certain threshold according to the waterfall data stored in the waterfall configuration store 250. For example, if the email address type of user identifying information is considered to have a measure of accuracy above the threshold value, and the third party user identifying information has email addresses as a type of user identifying information, the online system 140 identifies email addresses as one of the high accuracy sets of user identifying information. In one embodiment, the threshold measure of accuracy is a set value (e.g., above 80% accuracy passes the threshold), which may be indicated by the third party system 130. In another embodiment, when the third party system 130 is a sponsored content provider, the threshold is determined as being proportional to an expected rate of return on investment indicated by the third party system 130.

For example, if the third party system 130 indicates a desired rate of return of 30% from presenting sponsored content to the users indicated by the third party user identifying information, the online system 140 may adjust the threshold so that the actual rate of return approaches the desired rate of return. The rate of return may refer to the value generated by a user in response to being presented with the sponsored content compared to the compensation provided by the third party system 130 to the online system 140 for presenting the sponsored content to the user.

The online system 140, e.g., the waterfall scorer 320 as described in conjunction with FIG. 3, identifies 420 as high confidence matches those local users of the online system 140 with local user identifying information having the high accuracy sets of local user identifying information that match a corresponding set of third party user identifying information. For example, if date of birth and email are indicated in the waterfall data to be a set of information that have a high measure of accuracy above the threshold, then the online system 140 may attempt to match local users with user identifying information including a date of birth and an email address with the third party user identifying information received from the third party system 130 for third party users. Any of these matches found by the online system 140 are considered to be high confidence matches. The high confidence of the match indicates that it is unlikely that the matched local user is not the same as the third party user identified by the third party user identifying information, due to the high measure of accuracy of the set of user identifying information used.

The online system, e.g., the waterfall scorer 320 as described in conjunction with FIG. 3, identifies 425 as low confidence matches those local users of the online system that have local user identifying information that are not high accuracy sets and that match third party user identifying information. For example, assume a name and date of birth is not considered to be a high accuracy set of user identifying information. If a local user of the online system has user identifying information including a name and date of birth that match a name and date of birth in the third party user identifying information, the online system 140 identifies this local user as a low confidence match.

Note that in some cases, the online system 140 may determine that multiple local users match a corresponding third party user identifying information. For example, more than one local user may have local user identifying information matching a third party user identifying information 450 for a third party user specifying only a name of "John Smith" and a location of "San Francisco." The online system 140 may in some cases remove these users that match the same third party user identifying information.

Subsequent to identifying a set of low confidence matches and a set of high confidence matches, the online system 140, e.g., the similarity scorer 360 as described in conjunction with FIG. 3, identifies 430 a set of similar matches that include those low confidence matches that have a measure of similarity to the high confidence matches that is greater than a threshold value.

In one embodiment, to determine the measure of similarity of the low confidence matches to the high confidence matches, the online system 140 identifies the users of the low confidence matches that have at least a threshold number or percentage of characteristics matching or similar to characteristics that at least some of the high confidence matches share in common. In another embodiment, to determine the measure of similarity of the low confidence matches to the high confidence matches, the online system 140 identifies the users of the low confidence matches that have at least at least a threshold number or percentage of interests matching interests specified by at least a threshold number of the high confidence matches. These interests may be stored in user profiles of the users. Similarly, the online system 140 may identify users of the low confidence matches who interacted with content items of the online system 140 having at least a threshold number or percentage of characteristics matching characteristics of content items with which the high confidence matches interacted. Other characteristics can also be utilized, such as matching demographics between users, similar affinity scores for particular content or types of content, connections to similar content or users, similar patterns of interacting with content, etc.

The online system 140 may train and apply a similarity model to the characteristics of the high confidence matches and the content items that the high confidence matches have interacted with. The similarity model may be any type of statistical model (e.g., neural network, Bayesian network) that can make a prediction (e.g., in the form of a percentage) of a similarity of characteristics of a user of the online system 140 to the characteristics trained in the similarity model. For example, the similarity model may predict the similarity based on how many characteristics are shared between two users out of a total number of characteristics logged by the online system 140. Using the similarity model, the online system 140 can identify the users of the low confidence matches that have a threshold measure of similarity to the high confidence matches.

The actual threshold value for the threshold measure of similarity may be set at a particular number of sigmas of a standard deviation of all (or a random sampling of) users of the online system 140 as measured using the measurement for the threshold measure of similarity against the high confidence matches. Alternatively, the threshold measure may be set to the average value of all (or a random sampling of) users of the online system 140 as measured using the measurement for the threshold measure of similarity. In another embodiment, the online system 140 measures the similarity of a random sampling of users in the online system against the high confidence matches, and set the threshold level to a confidence level (e.g., 99%) that the randomly selected user is similar to a high confidence match (and is not just due to a statistical noise).

Additional methods of determining similarity between groups of users of an online system are further described in U.S. Patent Pub. No. 2013/0124298, filed on Nov. 15, 2011, U.S. Patent Pub. No. 2015/0332336, filed on May 29, 2014, U.S. patent application Ser. No. 14/719,780, filed on May 22, 2015, all of which are hereby incorporated by reference in their entirety.

In one embodiment, the high confidence matches and similar matches that are identified by the online system 140 are limited to a particular geographical area. The geographical location of each match may be determined by the online system 140 using information in the user's user profile or using other methods such as IP geolocation.

In one embodiment, the online system 140 further filters matches from the similar matches if more than one of the matches match the same third party user identifying information for a third party user. For example, multiple local users of the online system may match a third party user identifying information indicating a name of "Jane Doe" and a postal code of "10001." Furthermore, a name and postal code combination may be deemed by the online system 140 to be of low accuracy, and thus these local users are considered low confidence matches. The online system 140 then compares these low confidence matches for this particular name and postal code combination to the high confidence matches, and retains those that are above a threshold measure of similarity. If, after determining the similar matches, more than one match for a single set of third party user identifying information exists, the online system 140, in one embodiment, removes these "duplicate" matches and only retains the match with the highest measure of similarity. In one embodiment, the online system 140 removes all these "duplicate matches." In another embodiment, the online system 140 retains all duplicate matches, or in another embodiment, the online system retains a number of duplicate matches corresponding to a number specified by the third party system 130.

Once the online system 140 identifies 430 the high confidence matches and the similar matches, in one embodiment, the online system 140 further determines a score for each of the high confidence matches and the similar matches. In one embodiment, the score of each high confidence match is based on the measure of accuracy of the set of user identifying information used when the online system 140 successfully matched the high confidence match. In one embodiment, the score of each similar match is based on the measure of similarity determined for that similar match when compared against the high confidence matches.

After determining the high confidence matches and the similar matches, the online system 140, e.g., the presentation module 350 as described in conjunction with FIG. 3, presents 435 a selection of the high confidence matches and the similar matches to the third party system 130. In one embodiment, the online system 140 only presents to the third party system 130 an option to select the group of similar matches in addition to the group of high confidence matches, without revealing additional information regarding personal information for any of the matches. In one embodiment, the online system 140 additionally reveals metadata regarding the matches that does not uniquely identify any of the matches. For example, the online system 140 may indicate a primary geographic region, age group, gender, and other information regarding the matches. As noted above, the online system 140 may compute a score for each match, and in one embodiment, the online system 140 also indicates a range of scores computed for each group of matches.

In one embodiment, the online system 140 further indicates a bid for each group of matches. As noted above, a bid is compensation requested by the online system 140 from the third party system 130 for presentation of sponsored content during an impression opportunity to a local user of the online system 140. In such a case, the online system 140 may also indicate a lowered bid amount for the similar matches compared to the high confidence matches, implicitly indicating that the similar matches may not have an equal accuracy measure compared to the high confidence matches. The decrease in the bid amount may be computed by the online system 140 based upon the scores of similar matches. For example, the online system 140 may compare normalized scores for the similar users and the high confidence matches, and lower the bid amount according to the difference between the scores for the similar users and the high confidence matches.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, at an online system, third party user identifying information from a third party system, the third party user identifying information comprising user identifying information of each of a plurality of third party users of the third party system;
   in response to receiving the third party user identifying information, accessing, at a storage device of the online system, user identifying information for a set of local users of the online system;
   in response to receiving the third party user identifying information, accessing a set of accuracy measures stored at a storage device of the online system, wherein each accuracy measure of the set of accuracy measures is associated with a type of user identifying information of a set of types of user identifying information and indicates a likelihood that a type of user identifying information associated with the accuracy measure correctly identifies a user;
   identifying, as high confidence matches, one or more local users of the set of local users associated with user identifying information that 1) is of a type of the set of types that is associated with an accuracy measure of the set of accuracy measures above a threshold level, and that 2) matches user identifying information of a third party user of the plurality of third party users; and
   transmitting the high confidence matches for presentation to the third party system.

2. The method of claim 1, wherein the third party user identifying information includes one or more of: addresses, unique identifiers, network addresses, date of births, postal codes, physical addresses, geolocations, names, genders, and phone numbers.

3. The method of claim 1, further comprising:
identifying one or more types of user identifying information in the third party user identifying information;
identifying sets of the one or more types of user identifying information in the third party user identifying information that provide user identifying information for at least one third party user of the plurality of third party users; and
identifying, as high accuracy sets of user identifying information, the sets of the types of user identifying information in the plurality of third party identifying information that match one or more sets of user identifying information with accuracy measures above a threshold level.

4. The method of claim 3, further comprising:
identifying as high accuracy matched users those local users of the online system having local user identifying information in sets of user identifying information that match the high accuracy sets of user identifying information;
matching the sets user identifying information of one or more of the high accuracy matched users with corresponding sets of the third party user identifying information; and
identifying as high confidence matches those high accuracy matched users with matches to the corresponding sets of the third party user identifying information.

5. The method of claim 1, further comprising:
identifying as low accuracy matched users those local users of the online system having local user identifying information in sets of user identifying information that do not match the high accuracy sets of user identifying information;
matching the sets of user identifying information of one or more of the low accuracy matched users with corresponding sets of the third party user identifying information; and
identifying as low confidence matches those low accuracy matched users with matches to the corresponding sets of the third party user identifying information.

6. The method of claim 5, further comprising:
identifying as similar matches those of the low confidence matches that have a measure of similarity to one or more of the high confidence matches that is beyond a threshold measure of similarity, the measure of similarity based at least in part on one or more characteristics of the low confidence matches matching the identified one or more characteristics associated with each of the high confidence matches; and
transmitting a list of the similar matches to the third party system.

7. The method of claim 6, further comprising:
determining a score for each of the similar matches based on the measure of similarity for each similar match;
determining a score for each high confidence match based on the accuracy measure of a high accuracy set of user identifying information used to match the high confidence match; and
transmitting, to the third party system, the scores for each similar match and the scores for each high confidence match.

8. The method of claim 6, further comprising:
determining a bid value for each of the similar matches, the bid value for each of the similar matches being proportional to a bid value for a high confidence match based on the measure of similarity of the similar match to the high confidence match; and
transmitting the bid values to the third party system.

9. The method of claim 6, wherein the high confidence matches and the similar matches are limited to those users of the online system within a particular geographic region.

10. The method of claim 1, wherein the third party user identifying information is hashed, and wherein local user identifying information of local users is matched to the third party user identifying information by hashing the local user identifying information of the local users and comparing a hash of the local user identifying information to a hash of the third party user identifying information.

11. A computer program product comprising a non-transitory computer readable storage medium having instructions encoded thereon that, when executed by a processor, cause the processor to:
receive, at an online system, third party user identifying information from a third party system, the third party user identifying information comprising user identifying information of each of a plurality of third party users of the third party system;
in response to receiving the third party user identifying information, accessing, at a storage device of the online system, user identifying information for a set of local users of the online system;
in response to receiving the third party user identifying information, access a set of accuracy measures stored at a storage device of the online system, wherein each accuracy measure of the set of accuracy measures is associated with a type of user identifying information of a set of types of user identifying information, and indicates a likelihood that a type of user identifying information associated with the accuracy measure correctly identifies a user;
identify, as high confidence matches, one or more local users of the set of local users associated with user identifying information that 1) is of a type of the set of types that has an is associated with an accuracy measure of the set of accuracy measures above a threshold level, and that 2) matches user identifying information of a third party user of the plurality of third party users; and
transmit the high confidence matches for presentation to the third party system.

12. The computer program product of claim 11, wherein the user identifying information includes one or more of: addresses, unique identifiers, network addresses, date of births, postal codes, physical addresses, geolocations, names, genders, and phone numbers.

13. The computer program product of claim 11, having further instructions, that when executed by a processor, cause the processor to:
identify one or more types of user identifying information in the third party user identifying information;
identify sets of the one or more types of user identifying information in the plurality third party user identifying information that provide user identifying information for at least one third party user of the plurality of third party users; and
identify, as high accuracy sets of user identifying information, the sets of the types of user identifying information in the plurality of third party identifying information that match one or more sets of user identifying information with accuracy measures above a threshold level.

14. The computer program product of claim 13, having further instructions, that when executed by a processor, cause the processor to:

identify as high accuracy matched users those local users of the online system having local user identifying information in sets of user identifying information that match the high accuracy sets of user identifying information;

match the sets user identifying information of one or more of the high accuracy matched users with corresponding sets of the third party user identifying information; and identify as high confidence matches those high accuracy matched users with matches to the corresponding sets of the third party user identifying information.

15. The computer program product of claim 11, having further instructions, that when executed by a processor, cause the processor to:

identify as low accuracy matched users those local users of the online system having local user identifying information in sets of user identifying information that do not match the high accuracy sets of user identifying information;

match the sets of user identifying information of one or more of the low accuracy matched users with corresponding sets of the third party user identifying information; and identify as low confidence matches those low accuracy matched users with matches to the corresponding sets of the third party user identifying information.

16. The computer program product of claim 15, having further instructions, that when executed by a processor, cause the processor to:

identify as similar matches those of the low confidence matches that have a measure of similarity to one or more of the high confidence matches that is beyond a threshold measure of similarity, the measure of similarity based at least in part on one or more characteristics of the low confidence matches matching the identified one or more characteristics associated with each of the high confidence matches; and transmit a list of the similar matches to the third party system.

17. The computer program product of claim 16, having further instructions, that when executed by a processor, cause the processor to:

determine a score for each of the similar matches based on the measure of similarity for each similar match;

determine a score for each high confidence match based on the accuracy measure of a high accuracy set of user identifying information used to match the high confidence match; and transmit, to the third party system, the scores for each similar match and the scores for each high confidence match.

18. The computer program product of claim 16, having further instructions, that when executed by a processor, cause the processor to:

determine a bid value for each of the similar matches, the bid value for each of the similar matches being proportional to a bid value for a high confidence match based on the measure of similarity of the similar match to the high confidence match; and transmit the bid values to the third party system.

19. The computer program product of claim 16, wherein the high confidence matches and the similar matches are limited to those users of the online system within a particular geographic region.

20. The computer program product of claim 11, wherein the third party user identifying information is hashed, and wherein local user identifying information of local users is matched to the third party user identifying information by the hashing local user identifying information of the local users and comparing a hash of the local user identifying information to a hash of the third party user identifying information.

* * * * *

UNITED STATES PATENT AND TRADEMARK OFFICE
CERTIFICATE OF CORRECTION

PATENT NO. : 11,334,556 B1
APPLICATION NO. : 16/421394
DATED : May 17, 2022
INVENTOR(S) : Rituraj Kirti It is certified that error appears in the above-identified patent and that said Letters Patent is hereby corrected as shown below:

In the Claims

In Column 18, Claim 11, Line 37, delete "that has an" and insert -- that --, therefor.

In Column 18, Claim 13, Line 55, delete "plurality third" and insert -- plurality of third --, therefor.

Signed and Sealed this
Twenty-first Day of February, 2023

Katherine Kelly Vidal
*Director of the United States Patent and Trademark Office*